United States Patent
Manlove et al.

(10) Patent No.: US 6,559,557 B2
(45) Date of Patent: May 6, 2003

(54) ERROR DETECTION CIRCUIT FOR AN AIRBAG DEPLOYMENT CONTROL SYSTEM

(75) Inventors: Gregory J. Manlove, Kokomo, IN (US); Lee C. Boger, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 306 days.

(21) Appl. No.: 09/742,792

(22) Filed: Dec. 20, 2000

(65) Prior Publication Data

US 2002/0074859 A1 Jun. 20, 2002

(51) Int. Cl.[7] ............................................... B60R 21/01
(52) U.S. Cl. ........................ 307/10.1; 701/45; 180/282; 280/728.1
(58) Field of Search ................................. 307/9.1, 10.1; 701/45, 47, 46; 280/728.1; 180/282; 342/106

(56) References Cited

U.S. PATENT DOCUMENTS

| | | | | |
|---|---|---|---|---|
| 4,138,677 A | * | 2/1979 | Sinclair, Jr. | 342/106 |
| 5,068,793 A | * | 11/1991 | Condne et al. | 701/46 |
| 5,318,146 A | * | 6/1994 | Witte | 180/282 |
| 5,440,485 A | * | 8/1995 | Okimoto et al. | 701/46 |
| 5,483,451 A | * | 1/1996 | Ohmae et al. | 701/46 |
| 5,538,099 A | * | 7/1996 | Blackburn et al. | 180/282 |
| 5,790,404 A | * | 8/1998 | Faye et al. | 701/45 |
| 5,801,619 A | | 9/1998 | Liu et al. | |
| 5,914,653 A | * | 6/1999 | Takeuchi et al. | 280/728.1 |
| 6,104,973 A | * | 8/2000 | Sugiyama et al. | 701/46 |
| 6,256,562 B1 | * | 7/2001 | Frimberger et al. | 701/45 |
| 6,272,412 B1 | * | 8/2001 | Wu et al. | 701/47 |
| 6,292,728 B1 | * | 9/2001 | Masegi | 701/45 |
| 6,330,500 B1 | * | 12/2001 | Moriyama et al. | 701/45 |
| 6,426,567 B2 | * | 7/2002 | Ugusa et al. | 307/10.1 |
| 6,430,489 B1 | * | 8/2002 | Dalum | 701/45 |

FOREIGN PATENT DOCUMENTS

| | | | | |
|---|---|---|---|---|
| JP | 04-078640 | * | 3/1992 | B60R/21/32 |
| JP | 04-244454 | * | 9/1992 | B60R/21/32 |

* cited by examiner

*Primary Examiner*—Brian Sircus
*Assistant Examiner*—Robert J. Rios
(74) *Attorney, Agent, or Firm*—Jimmy L. Funke

(57) ABSTRACT

An error detection circuit for an airbag deployment control system includes a delay circuit receiving an analog acceleration signal, a difference circuit producing a difference signal based on a time difference between the original and delayed acceleration signals, and a first comparator circuit comparing the difference signal to first and second threshold signals. If the difference signal falls within an error region defined between the first and second threshold values, a decision circuit inhibits an otherwise pending airbag deployment event. If, on the other hand, the difference signal falls outside of the error region, the decision circuit allows airbag deployment with minimal delay. The error detection circuit further includes a second comparator circuit comparing the acceleration signal to near-supply and near-ground threshold values, wherein the decision circuit also inhibits airbag deployment if the acceleration signal magnitude exceeds the near-supply threshold value or falls below the near-ground threshold value.

18 Claims, 9 Drawing Sheets

# ERROR DETECTION CIRCUIT FOR AN AIRBAG DEPLOYMENT CONTROL SYSTEM

TECHNICAL FIELD

The present invention relates generally to circuitry for controlling automotive airbag or Supplemental Inflatable Restraint Systems, and more particularly, to circuitry for detecting non-deployment conditions in seemingly deployable circumstances and inhibiting deployment of the airbag based on detection of such conditions.

BACKGROUND OF THE INVENTION

Airbags are commonplace in automotive vehicles as a result of the need to improve occupant safety in collisions. In fact, airbags are standard equipment in many, if not most, late model automotive vehicles. These airbags are typically located in strategic places, such as the steering wheel of a vehicle, and are intended to help reduce occupant injury in the event of a crash. In general, airbag management requires specialized systems for detecting collisions, deploying airbags when appropriate, and also inhibiting airbag deployment when the crash is not sufficiently severe to warrant airbag deployment.

Airbag management systems typically include at least one acceleration sensor, commonly referred to as an accelerometer, to sense acceleration/deceleration along a specific axis. Deployment of the airbag generally occurs only when the accelerometer senses at least a minimum acceleration along an appropriate axis. Typically, an airbag management system includes a number of accelerometers for sensing acceleration along a corresponding number of axes.

In the operation of typical airbag management systems, an accelerometer senses acceleration and produces an acceleration signal, wherein the acceleration signal is processed via a decision circuit to determine whether airbag deployment is warranted. Generally, however, great care must be exercised in designing such systems to avoid inadvertent airbag deployment. Inadvertent airbag deployment is not only costly, as the result of having to repair and replace the deployed airbag, but it can also create a potentially dangerous situation for the occupants. For example, inadvertent deployment may force the driver out of position or otherwise impair the driver's ability to safely operate the vehicle. To reduce the possibility of inadvertent airbag deployment, some airbag management systems include a redundant "arming" sensor (e.g., accelerometer) operable to alert the system of a potential deployment condition only if the crash is above a crash severity threshold.

Referring to FIG. 1, one known airbag management system 100 is shown including such a redundant arming sensor 110. System 100 also includes at least one accelerometer 120 suitably positioned for controlling a corresponding airbag. The accelerometer 120 senses and transduces an acceleration 130 into an analog acceleration signal proportional to the amount of acceleration sensed, typically measured in multiples of gravitation force units denoted by the symbol G.

The accelerometer 120 provides the analog acceleration signal to an analog to digital (A/D) converter 140 via signal path 122 which converts the signal to a digital acceleration signal and provides this digital signal to a microprocessor 150 via signal path 142. The microprocessor 150 is electrically connected to a deployment circuit 160 via signal path 154 which is itself electrically connected to an inhibit deployment circuit 170 electrically connected to arming sensor 110 via signal path 112. An output of the inhibit deployment circuit 170 is connected to an actuator (not shown) of an airbag 174 via signal path 172.

The microprocessor 150 typically includes a deployment control algorithm 152 for determining whether the digital acceleration signal on signal path 142 is of sufficient magnitude to deploy airbag 174, and provides a signal corresponding thereto to the deployment circuit 160. The arming sensor 110 is also operable to sense acceleration and provide a corresponding acceleration signal to the inhibit deployment circuit 170. Typically, the arming sensor 110 is configured to provide greater resolution in the lower G ranges, and the inhibit deployment circuit 170 is operable to process this signal to determine whether the crash event is sufficiently severe to allow deployment of the airbag 174. If, for example, the inhibit deployment circuit 170 determines that the acceleration signal produced by arming sensor 110 is below a predefined G threshold, circuit 170 is operable to inhibit any deployment signal produced by deployment circuit 160 on signal path 162 so that the airbag 174 is not deployed. If, on the other hand, the inhibit deployment circuit 170 determines that the acceleration signal produced by arming sensor 110 is above the predefined G threshold, circuit 170 is operable to pass any deployment signal produced by deployment circuit 160 to airbag 174 via signal path 172 to thereby deploy the airbag 174.

The airbag management system 100 just described includes a multitude of components including the arming sensor 110. These components increase the cost and complexity of system 100. Further, as the number of accelerometers 120 increase, the number of arming sensors 110 increases linearly. Therefore, for every accelerometer 120 located in the vehicle to sense along a certain axis, an arming sensor 110 must be located along the same axis, and preferably in close proximity to the accelerometer. Not only is this cost restrictive, physically locating these devices in close proximity is oftentimes impractical and sometimes impossible. Moreover, physical and electronic constraints of standard microprocessors limit the number of accelerometers that the system can manage. As more accelerometers are added, processing time becomes a constraint and thus unacceptable delays in the deployment of the airbag ensue, thereby compromising the safety of the occupants of the vehicle.

Referring now to FIG. 2, another known airbag management system 180 is shown that eliminates the need for arming sensor 110 but that incorporates and implements the arming sensor's functions into a microprocessor 190. System 180 includes many of the same components as system 100 of FIG. 1, and like components are therefore identified with like reference numbers. For example, an accelerometer 120 is responsive to an acceleration 130 to produce an analog acceleration signal on signal path 122. An A/D converter 140 is operable to convert the analog acceleration signal on signal path 122 to a digital acceleration signal and provide this digital acceleration signal on signal path 142. Microprocessor 190 is responsive to the digital acceleration signal on signal path 142 to produce a deployment control signal on signal path 194 if a crash of sufficient severity is detected, in accordance with deployment control algorithm 152 as described hereinabove. A deployment circuit 170 is, in turn, responsive to the deployment control signal on signal path 194 to produce a corresponding drive signal on signal path 172 to thereby deploy air bag 174.

In addition to algorithm 152, the microprocessor 190 is also programmed to assume the function of the arming sensor 110 of FIG. 1 by including a software algorithm 192 operable to determine the magnitude of the digital acceleration signal on signal path 142 and assess whether this magnitude is sufficiently large along the proper axis to cause the deployment control algorithm (e.g., algorithm 152) to produce an active deployment control signal for deploying the air bag 174.

Referring to FIG. 3, a flowchart illustrating one known embodiment of a software algorithm 200, resident within microprocessor 190 of FIG. 2, is shown, wherein algorithm 200 is operable to process the digital acceleration signal and determining whether to deploy, or inhibit deployment of, the airbag 174. The algorithm 200 thus incorporates therein both the deployment control algorithm 152 program and algorithm 192 described with respect to FIG. 2. At step 202, the digital acceleration signal is received, and at step 204, the algorithm processes the digital acceleration signal in an known manner to determine whether to deploy the airbag 174. Step 204 thus corresponds to the execution of the deployment control algorithm 152. Thereafter at step 206, if the microprocessor 190 determines that airbag deployment is not warranted, algorithm execution advances to step 214 to inhibit airbag deployment. If, however, microprocessor 190 determines at step 206 that airbag deployment is warranted, algorithm execution advances to step 208 where microprocessor 190 is operable to calculate a time rate of change of the digital acceleration signal, preferably by comparing the absolute value of the digital acceleration signal with the absolute value of the previous digital acceleration signal, and compute a so-called "delta-jerk" value corresponding thereto. The delta-jerk value is compared thereafter at step 210 with a Max value. If delta-jerk is less than Max value, algorithm execution advances to step 214 to inhibit airbag deployment. If, on the other hand, the delta-jerk value is greater than or equal to the Max value at step 210, algorithm execution advances to step 212 where the delta-jerk value is compared to a Min value. If the delta-jerk value is less than or equal to the Min value, algorithm execution advances to step 214 to inhibit airbag deployment. If, however, the delta-jerk value is greater than the Min value at step 212, algorithm execution advances to step 216 where microprocessor 190 is operable to determine whether the digital acceleration signal is stuck to rail or ground by comparing the digital acceleration signal with upper and lower boundary values. Thereafter at steps 218 and 220, algorithm 200 is operable to advance to step 214 to inhibit airbag deployment if the digital acceleration signal is outside the upper or lower boundary values, and otherwise advances to step 222 to deploy the airbag 174.

The airbag calculation/deployment algorithm 200 of FIG. 3 is operable to process the digital acceleration signal to determine whether airbag deployment is warranted, and if so to monitor the time rate of change of the digital acceleration signal to determine whether to inhibit airbag deployment. The steps of algorithm 200 monitoring the time rate of change of the digital acceleration signal and comparing this value to maximum and minimum threshold values accomplish in software the function of the arming sensor 110 of the system 100 of FIG. 1. Step 210 inhibits airbag deployment in cases where the absolute value of the digital acceleration signal minus the previous digital signal is greater than the Max threshold, wherein such conditions are typically indicative of an output fault since true crash signal levels generally do not move fast enough to produce such large differences between signal values. Step 212 similarly inhibits airbag deployment in cases where the absolute value of the digital acceleration signal minus the previous digital signal is less than the Min threshold, wherein such conditions are typically indicative of an output fault since true crash data shows at least some minimum movement in the magnitude of the acceleration signals over time.

One drawback associated with the use of a software algorithm, such as algorithm 200, to detect deployment inhibit conditions is that such algorithms typically require a microprocessor to perform sophisticated calculations associated with at least the determination of the difference values. Requiring a microprocessor, in turn, increases the cost and complexity of airbag deployment discrimination systems. Generally, a microprocessor is not needed to accomplish the stuck-to-rail and stuck-to-ground comparisons of steps 216–220 since such steps are easily implemented in hardware with comparators. Likewise, a microprocessor is not needed to execute the deployment control algorithm 152 since supplemental inflatable restraint control systems are known that do not include a microprocessor but instead includes analog circuitry operable to execute in hardware an analog version of algorithm 152. One such control system is described in U.S. Pat. No. 5,801,619 which is assigned to the assignee of the present invention, and the contents of which are incorporated herein by reference.

The delta-jerk calculation of step 208, on the other hand, is not so easily realizable in hardware circuitry. On possible solution to this dilemma is to provide one or more microprocessors for executing at least the error detection functions (e.g., inhibit features of algorithm 192), but this would generally be cost prohibitive. An ideal solution to the foregoing problem would be to conduct the error detection functions; i.e., the airbag deployment inhibit features of steps 208–220 of algorithm 200, without microprocessor involvement, and then do away with the microprocessor altogether by implementing a supplemental inflatable restraint control system of the type described in U.S. Pat. No. 5,801,619. What is therefore needed is an error detection circuit for accomplishing at least the error detection features performed heretofore by either an arming accelerometer or a microprocessor executable control algorithm. Ideally, such a circuit should not delay airbag deployment under valid crash conditions of sufficient severity to warrant airbag deployment, and should generally be operable to inhibit airbag deployment for a number of different error conditions as well as other invalid crash events.

SUMMARY OF THE INVENTION

The foregoing shortcomings of the prior art are addressed by the present invention. In accordance with one aspect of the present invention, an error detection circuit for an airbag deployment control system comprises a delay circuit receiving an analog acceleration signal and producing a delay signal corresponding to the analog acceleration signal delayed in time, a differential circuit subtracting the delay signal from the analog acceleration signal and producing a difference signal corresponding thereto, and a first comparison circuit responsive to the difference signal to produce a first inhibit signal for inhibiting deployment of an airbag if the difference signal falls within a first predefined signal range.

In accordance with another aspect of the present invention, a method of inhibiting airbag deployment in an airbag deployment control system comprises the steps of receiving an analog acceleration signal over time, delaying the acceleration signal for a predefined time period and producing a delay signal corresponding thereto, subtracting the delay signal from the analog acceleration signal and producing a difference signal corresponding thereto, comparing the difference signal with a first signal window, and inhibiting deployment of an airbag if the difference signal falls within the first signal window.

One object of the present invention is to provide an error detection circuit for processing an analog acceleration signal and inhibiting airbag deployment under conditions wherein pending airbag deployment is the result of one or more error conditions and not the result of an actual crash event of sufficient severity to warrant airbag deployment.

Another object of the present invention is to provide such an error detection circuit for use with airbag deployment control systems that may or may not include a microprocessor-based airbag deployment control algorithm.

Yet another object of the present invention is to provide such an error detection circuit that does not delay airbag deployment under valid crash conditions of sufficient severity to warrant airbag deployment.

These and other objects of the present invention will become more apparent from the following description of the preferred embodiments.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
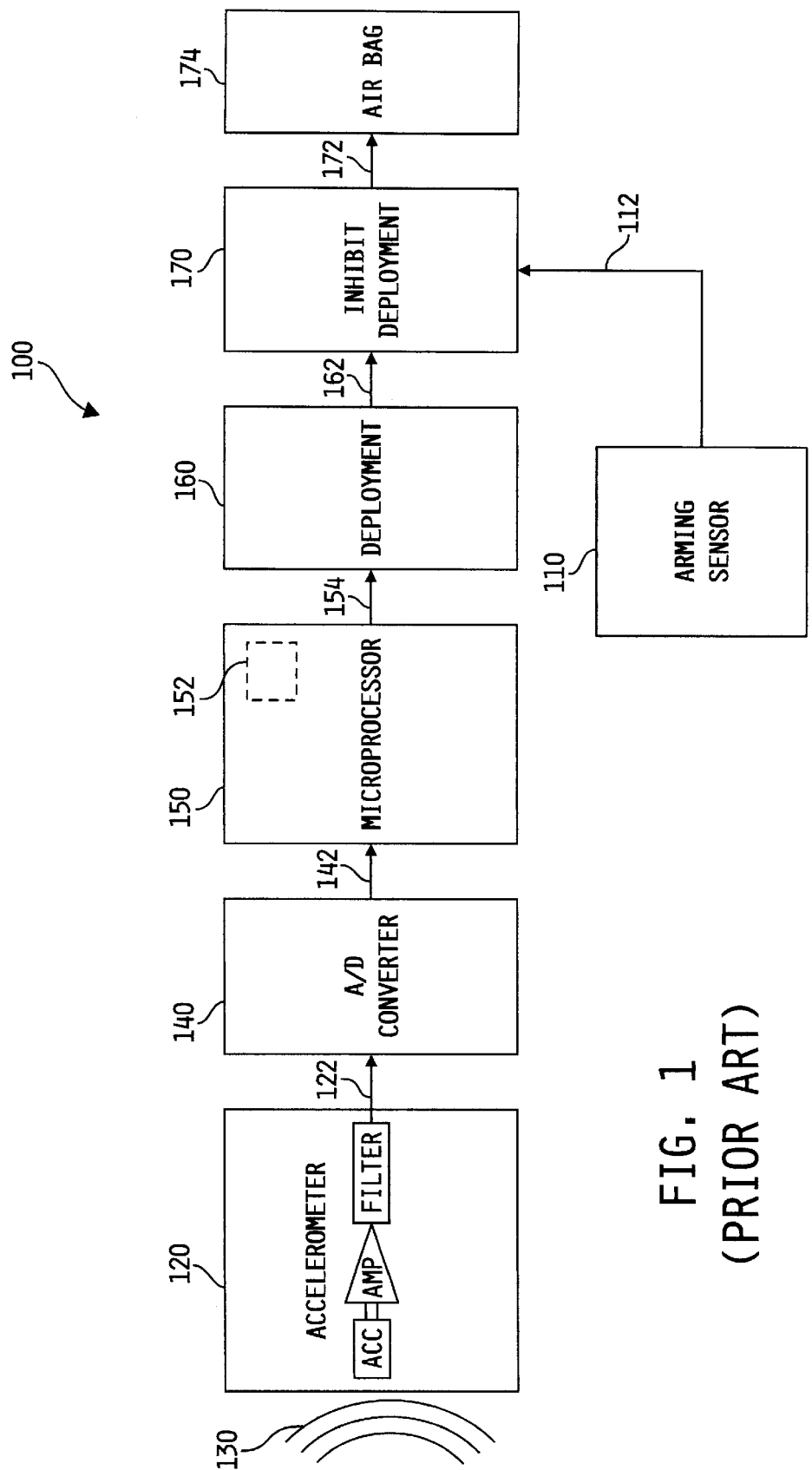
FIG. 1 is a diagrammatic illustration of a prior art airbag deployment crash detection system.
Figure 2:
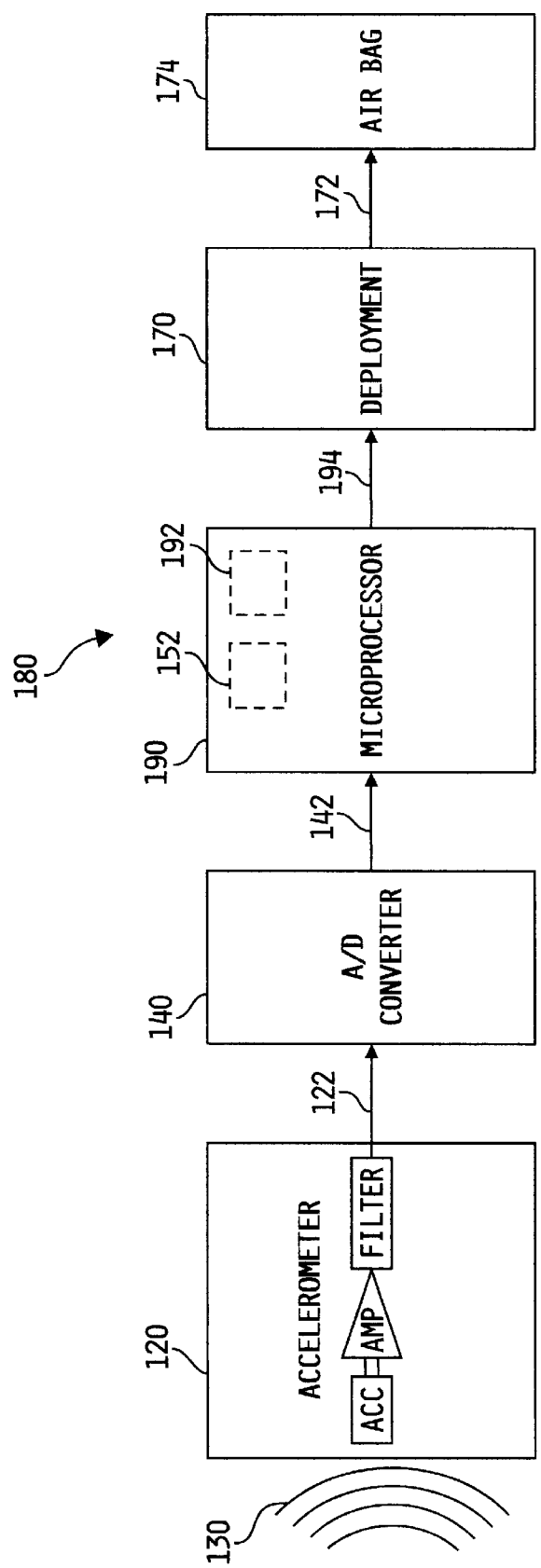
FIG. 2 is a diagrammatic illustration of another prior art airbag deployment crash detection system.
Figure 3:
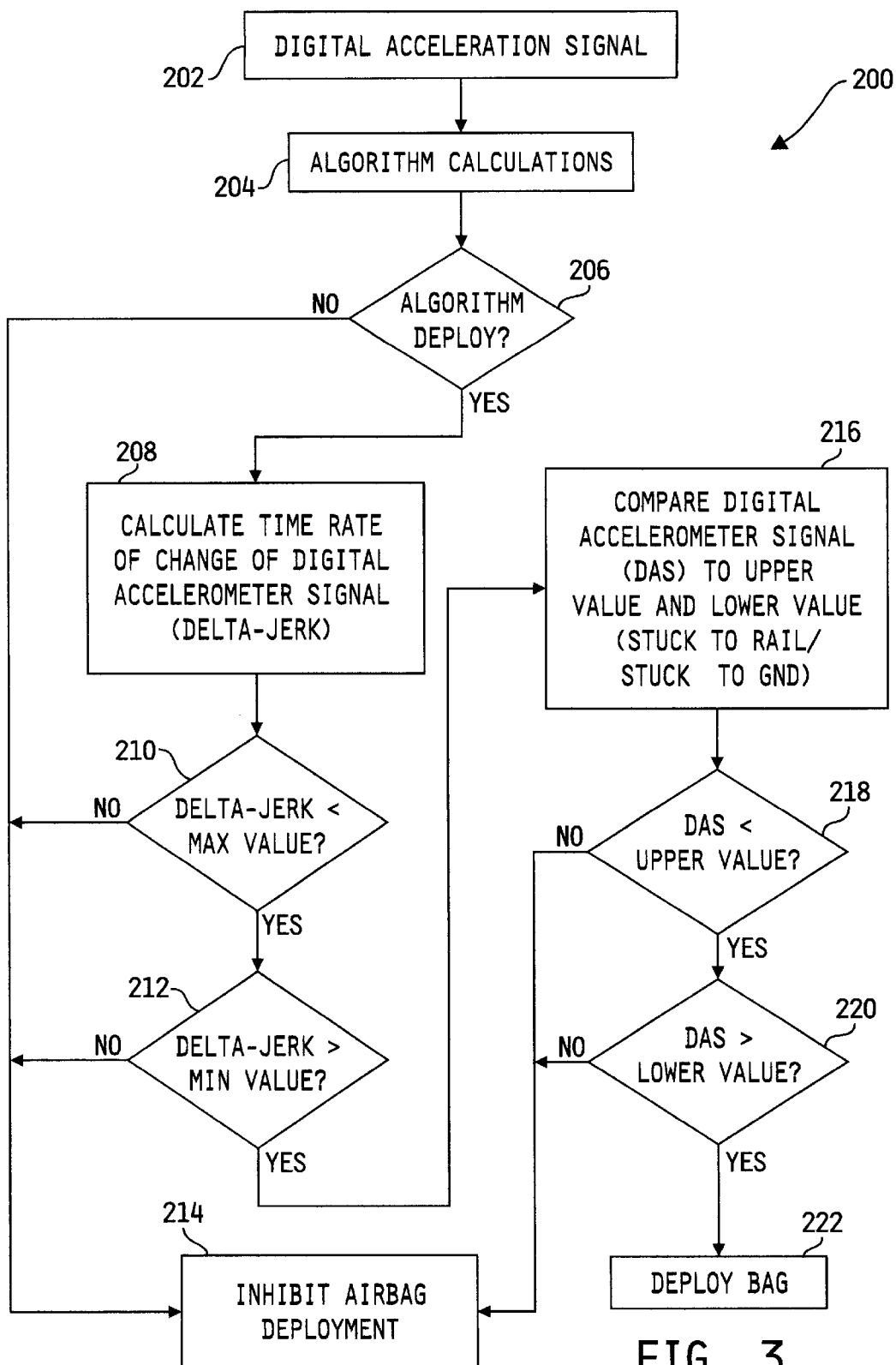
FIG. 3 is a flow chart of at least a portion of a known algorithm for managing airbag deployment and deployment inhibit conditions in the system of FIG. 2.
Figure 4:
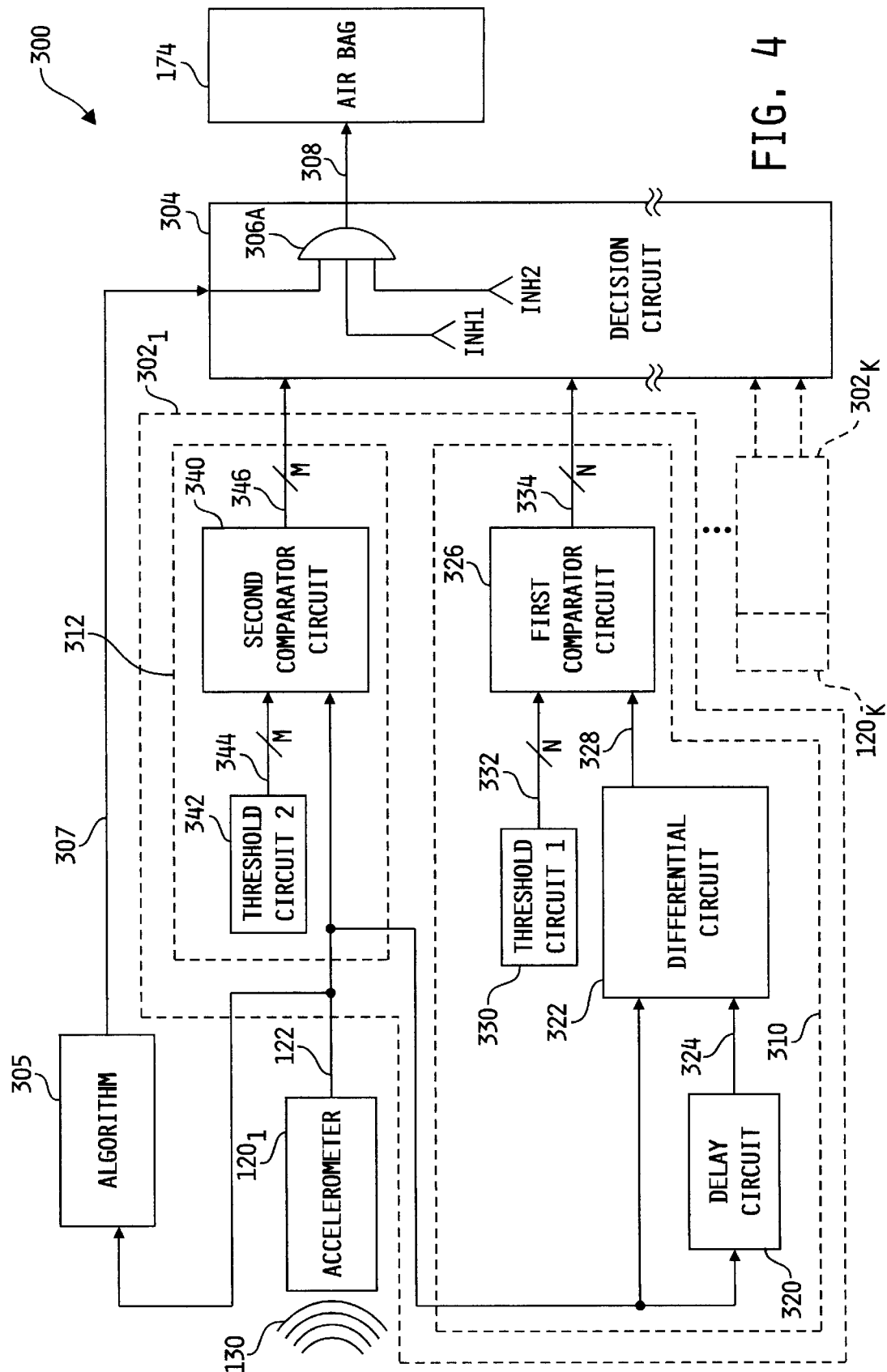
FIG. 4 is a diagrammatic illustration of one preferred embodiment of an airbag deployment control system, in accordance with the present invention.

Referring now to FIG. 4, one preferred embodiment of an airbag deployment control system 300, in accordance with the present invention is shown. System 300 is identical in some respects to systems 100 and 180 of FIGS. 1 and 2 respectively, and like components are accordingly identified with like reference numbers. For example, system 300 includes an accelerometer $120_1$ responsive to an acceleration 130 to produce an analog acceleration signal on signal path 122. System 300 also includes an airbag unit 174 having an airbag actuator (not shown) responsive to an airbag deploy signal to deploy an airbag contained therein.

In accordance with the present invention, system 300 includes at least one error detection circuit $302_1$ receiving the analog acceleration signal on signal path 122 and producing a number of error detection control signals on signal paths 334 and 346. An airbag deployment control algorithm 305 also receives the analog acceleration signal on signal path 122 and produces an airbag deployment control signal on signal path 307. Preferably, an active state (e.g., high logic level) of the airbag deployment control signal corresponds to request for airbag deployment, and an opposite inactive state (e.g., low logic level) of the airbag deployment control signal corresponds to non-deployment request. In one embodiment, algorithm 305 preferably corresponds to a known analog airbag deployment control algorithm; i.e., an airbag deployment control algorithm not requiring a microprocessor for execution thereof, such as that described in U.S. Pat. No. 6,801,619. Alternatively, algorithm 305 may be a known software algorithm, such as algorithm 152 described hereinabove with respect to FIG. 1, executable by one or more microprocessors. In any case, signal path 307 and signal paths 334 and 346 are all electrically connected to a decision circuit 304, wherein decision circuit 304 preferably includes a logic gate, such as a three-input AND gate 306A, receiving at one input the airbag deployment signal from algorithm 305, a first inhibit signal INH1 at a second input and a second inhibit signal INH2 at a third input thereof, and producing an airbag control signal on signal path 308 at an output thereof. With the system 300 configured as shown, the inhibit signals INH1 and INH2 are active low, meaning that the airbag will thus be deployed only if the airbag deployment control signal on signal path 307 is a high level logic signal (i.e., active) and both of the inhibit signals INH1 and INH2 are high level logic signal (i.e., inactive), and will be inhibited from deployment if either of the inhibit signals INH1 or INH2 is a low logic level signal (i.e., inactive) regardless of the logic level of the airbag deployment control signal on signal path 307. Decision circuit 304 preferably includes a number of additional logic gates, as will be described in greater detail hereinafter, for generating the inhibit signals INH1 and INH2 as a function of the error circuitry of the present invention.

It is to be understood that system 300 may include any number, K, of error detection circuits $302_1$–$302_K$, each receiving analog acceleration signals produced by corresponding accelerometers $120_1$–$120_K$, and each supplying corresponding output signals to decision circuit 304 as shown in phantom in FIG. 4. In general, K may be any positive integer. Although not specifically illustrated in the drawings for brevity's sake, those skilled in the art will also recognize that system 300 may include additional airbags 174 as well as additional algorithm circuits and/or software algorithms 305.

In any case, the error detection circuit $302_1$ of FIG. 4 preferably includes two sub-circuits; namely a signal threshold discrimination circuit 310 and a rail/ground discrimination circuit 312. In accordance with the present invention, the signal threshold discrimination circuit 310 is generally operable to perform the function of the arming sensor 110 of FIG. 1 and of the software algorithm 192 of FIG. 2 by monitoring the analog acceleration signal produced by the accelerometer $120_1$ and determining therefrom whether an otherwise active airbag deployment signal produced by algorithm 305 should be inhibited. In this regard, circuit 310 includes a delay circuit 320 receiving the analog acceleration signal via signal path 122 and producing a delayed analog acceleration signal on signal path 324. A differential circuit 322 receives the analog acceleration signal on signal path 122 as well as the delayed analog acceleration signal on signal path 324 and produces an analog difference signal on signal path 328 corresponding to a difference between the analog signals on signal paths 122 and 324. A comparator circuit 326 receives the analog difference signal on signal path 328 as well as a number, N, of analog threshold signals from a threshold circuit 330 via a corresponding number, N, of signal paths 332, wherein N may be any positive integer. The comparator circuit 326 is responsive to the analog difference signal on signal path 328 and to the number of analog threshold signals on signal paths 332 to compare the analog difference signal with one or more of the N analog threshold signals and provide a corresponding number, N, of logic level signals to decision circuit 304 via signals paths 334.

Figure 5:
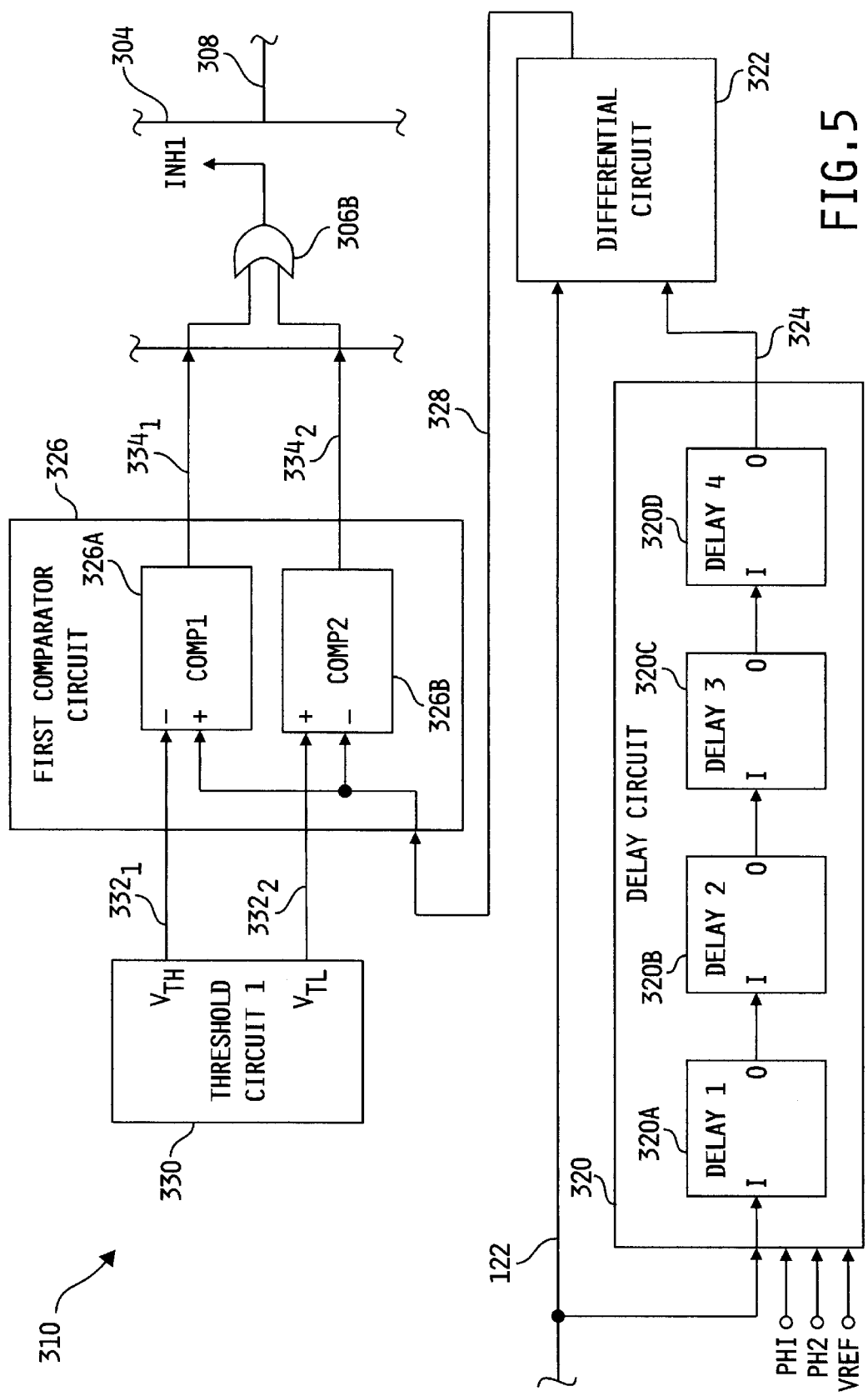
FIG. 5 is a diagrammatic illustration of one preferred embodiment of circuit 310 of FIG. 4, in accordance with the present invention.

Referring now to FIG. 5, one preferred embodiment of the signal threshold discriminating circuit 310 of FIG. 4, in accordance with the present invention, is shown. Delay circuit 320 preferably includes a number of delay sub-circuits, wherein four such delay sub-circuits 320A–320D are shown connected in cascade fashion. In addition to the analog acceleration signal on signal path 122, the delay circuit 320 also includes inputs for receiving clock signals PH1 and PH2, and an analog reference voltage VREF, wherein PH1 and PH2 a preferably two-phase non-overlapping clock signals. Each of the delay sub-circuits 320A–320D are preferably responsive to the clock signals PH1 and PH2 to delay the analog acceleration signal on signal path 122 by one clock cycle such that the delay circuit 320 is operable to produce a delayed analog acceleration signal on signal path 324 that is delayed from the analog acceleration signal on signal path 122 by approximately four clock cycles. Those skilled in the art will recognize that delay circuit 320 may be composed of any number of delay sub-circuits, or may be alternatively configured in accordance with other known delay circuitry, such as a known all-pass filter circuit, to provide for any desired delay. In one embodiment, for example, each delay sub-circuit 302A–320D is composed of a switched capacitor delay circuit, and one embodiment of such a circuit 320X is shown in FIG. 6.

Figure 6:
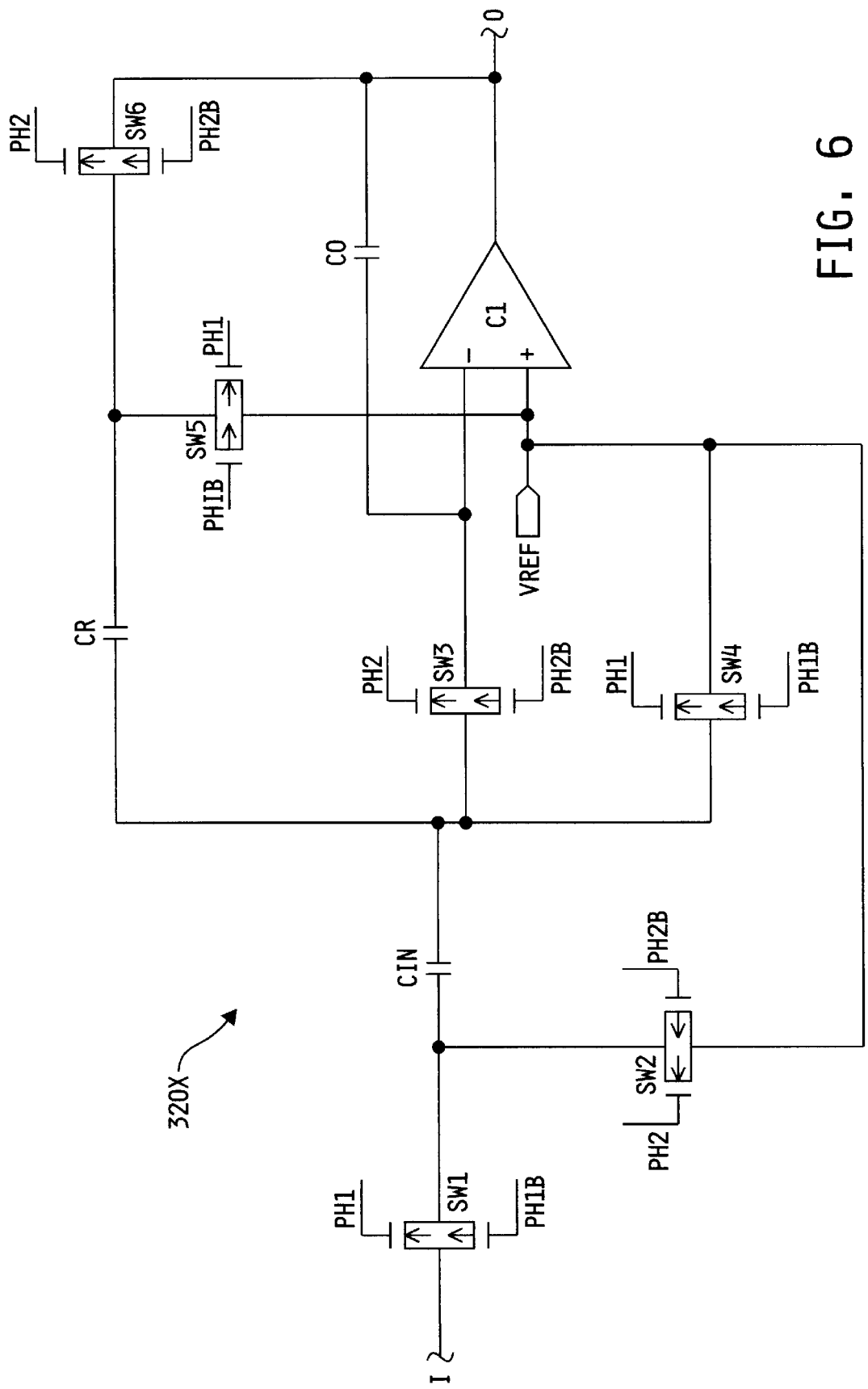
FIG. 6 is a diagrammatic illustration of one preferred embodiment of any of the delay circuits 320X of FIG. 5, in accordance with the present invention.

Referring to FIG. 6, delay sub-circuit 320X includes a switch SW1 receiving an input signal at input I, and an output connected to one end of a second switch SW2 and to one end of a capacitor CIN. SW1 is controlled by clock signals PH1 and PH1B, wherein PH1B is an inverted version of PH1. Switch SW2 is controlled by clock signals PH2 and PH2B, wherein PH2B is an inverted version of PH2, and has an opposite end connected to one end of a switch SW4, one end of a switch SW5 and to a non-inverting input of a comparator C1. The opposite end of SW4 is connected to one end of a switch SW3, to the opposite end of CIN and to one end of a capacitor CR. The opposite end of SW3 is connected to an inverting input of comparator C1 and to one end of a capacitor CO. The opposite end of CO is connected to an output of comparator C1 and to one end of a switch SW6, wherein the output of comparator C1 defines the output O of delay sub-circuit 320X. The opposite end of SW6 is connected to the opposite end of SW5 and to the opposite end of capacitor CR. Switches SW4 and SW5 are controlled by clock signals PH1 and PH1B, and switches SW3 and SW6 are controlled by clock signals PH2 and PH2B. The non-inverting input of comparator C1 receives the analog reference signal VREF, which is preferably set at the same voltage about which the analog acceleration signal on signal path 122 is centered (e.g., mid-supply). Capacitors CIN and CR are, in one embodiment, set at 5 pF and capacitor CO is set at 2 pF, although the present invention contemplates other capacitor values. In any case, those skilled in the art will recognize that sub-circuit 320X is operable to transfer an analog signal at input I to output O with a delay of one clock cycle PH1 (PH2). In one embodiment, PH1 and PH2 are preferably two-phase non-overlapping clock signals, as previously described, and are each set for a clock period of approximately 48 microseconds, such that the total delay time of delay circuit 320 is 4×48 microseconds, or 192 microseconds. It is to be understood, however, that the present invention contemplates other clock periods for PH1 and PH2, wherein any such clock period will typically be chosen to suit the particular application of error detection circuit $302_1$.

Referring back to FIG. 5, the delay circuit 320 produces an output signal onto signal path 324 corresponding to the analog acceleration signal on signal path 122 delayed by four clock cycles. The differential circuit 322 is preferably a known summation circuit operable to subtract the delayed analog acceleration signal on signal path 324 from the analog acceleration signal on signal path 122, and produce a corresponding analog difference signal on signal path 328.

In the embodiment shown in FIG. 5, the comparator circuit 326 includes a first comparator 326A having a non-inverting input connected to signal path 328 and a second comparator 326B having an inverting input connected to signal path 328. The threshold circuit 330, in this embodiment, thus produces two analog threshold voltages. A first (high) threshold voltage $V_{TH}$ is provided to the inverting input of comparator 326A via signal path $332_1$, and a second (low) threshold voltage $V_{TL}$ is provided to the non-inverting input of comparator 326B via signal path $332_2$, wherein $V_{TH}$ is preferably larger than $V_{TL}$. Analog threshold voltages $V_{TH}$ and $V_{TL}$ are produced using any known circuitry, and in one embodiment a resistor divider network referenced at supply voltage and ground is used to generate $V_{TH}$ and $V_{TL}$. In any case, the output of comparator 326A is provided to decision circuit 304 via signal path $334_1$, and the output of comparator 326B is provided to decision circuit 304 via signal path $334_2$.

In operation, the analog difference signal on signal path 328 is compared to the high and low analog threshold voltages $V_{TH}$ and $V_{TL}$ such that the output of comparator 326A is high if the analog difference signal on signal path 328 is greater than or equal to $V_{TH}$ and is otherwise low, and the output of comparator 326B is high if the analog difference signal on signal path 328 is less than $V_{TL}$ and is otherwise low. In this embodiment, decision circuit 304 preferably includes an OR gate 306B having inputs connected to signal paths $334_1$ and $334_2$, and having an output producing the inhibit signal INH1. Thus, as long as the analog difference signal on signal path 328 is above $V_{TH}$ or below $V_{TL}$, the INH1 output of OR gate 326B is a high logic level, corresponding to an inactive INH1 signal as described hereinabove with respect to FIG. 4. If, however, the analog difference signal on signal path 328 falls between $V_{TL}$ and $V_{TH}$, the INH1 output of OR gate 326B switches to a low logic level, corresponding to an active INH1 signal as described with respect to FIG. 4 and thereby inhibiting deployment of the airbag 174. It is to be understood that the present invention contemplates embodiments of the present invention wherein the inhibit signal INH1 is active high, and any necessary changes to the error detection circuit $302_1$ to effectuate such alternative operation are within the knowledge of a skilled artisan. In any case, the signal threshold discriminating circuit 310 is operable to monitor the change in the analog acceleration signal on signal path 122 over a predefined time period, and to inhibit airbag deployment if this change falls within a preset signal magnitude range defined by threshold voltages $V_{TL}$ and $V_{TH}$.

Referring again to FIG. 4, the rail/ground discrimination circuit 312 is generally operable to monitor the analog acceleration signal on signal path 122, and to inhibit airbag deployment if the magnitude of the analog acceleration signal exceeds a threshold value near supply voltage (e.g., rail), or falls below another threshold value near ground potential. In this regard, circuit 312 includes a comparator circuit 340 receiving the analog acceleration signal via signal path 122 as well as a number, M, of analog threshold signals from a threshold circuit 342 via a corresponding number, M, of signal paths 344, wherein M may be any positive integer. The comparator circuit 340 is responsive to the analog acceleration signal on signal path 122 and to the number of analog threshold signals on signal paths 344 to compare the analog acceleration signal with one or more of the M analog threshold signals and provide a corresponding number, M, of logic level signals to decision circuit 304 via signals paths 346.

Figure 7:
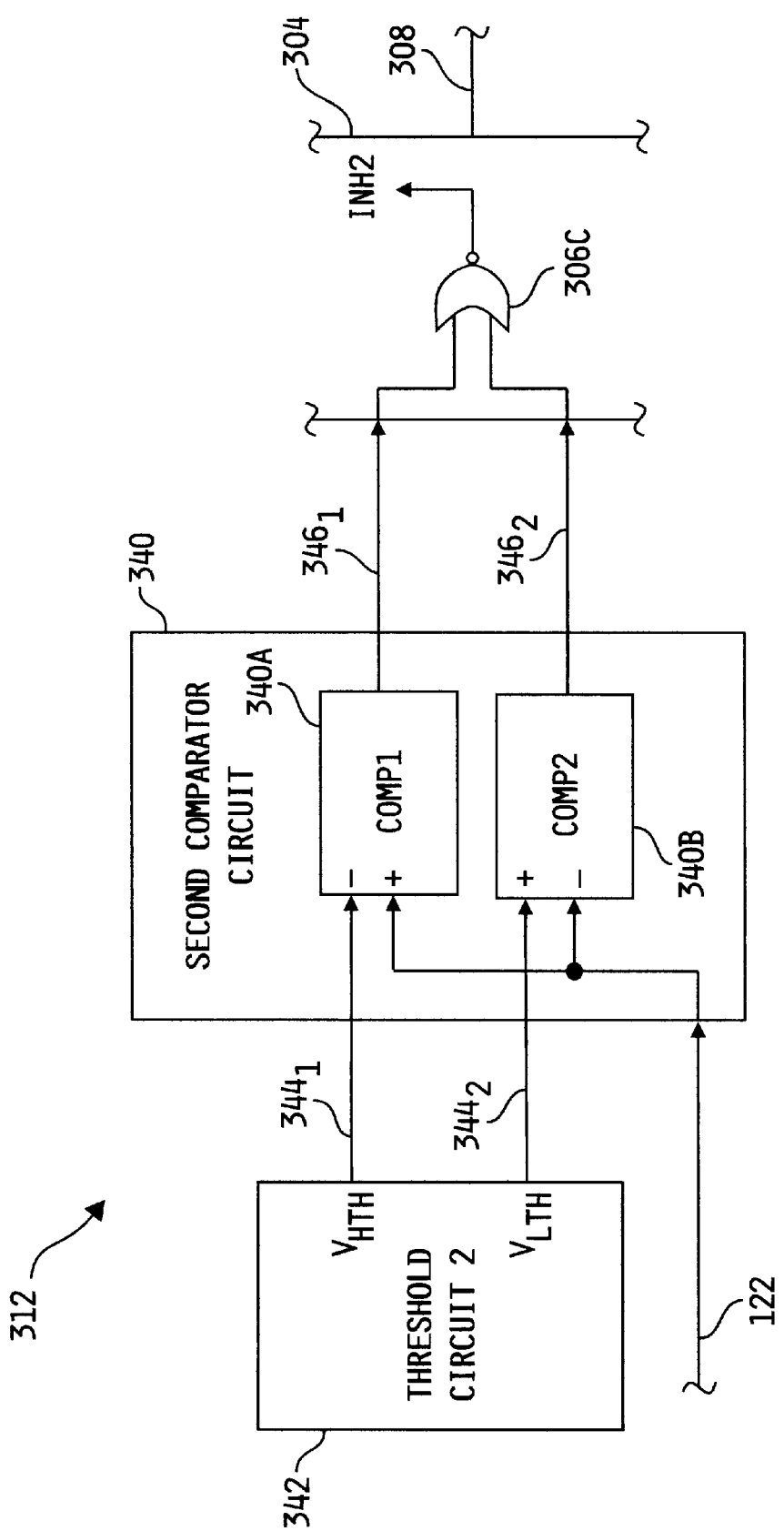
FIG. 7 is a diagrammatic illustration of one preferred embodiment of circuit 312 of FIG. 4, in accordance with the present invention.

Referring now to FIG. 7, one preferred embodiment of the rail/ground discriminating circuit 312 of FIG. 4, in accordance with the present invention, is shown. In the embodiment shown in FIG. 7, the comparator circuit 340 includes a first comparator 340A having a non-inverting input connected to signal path 122 and a second comparator 340B having an inverting input connected to signal path 122. As with the threshold circuit 330, the threshold circuit 342 in this embodiment thus produces two analog threshold voltages. A first (high) threshold voltage $V_{HTH}$ is provided to the inverting input of comparator 340A via signal path $344_1$, and a second (low) threshold voltage $V_{LTH}$ is provided to the non-inverting input of comparator 340B via signal path $344_2$, wherein $V_{HTH}$ is preferably larger than $V_{LTH}$. Analog threshold voltages $V_{HTH}$ and $V_{LTH}$ are produced using any known circuitry, and in one embodiment a resistor divider network referenced at supply voltage and ground is used to generate $V_{HTH}$ and $V_{LTH}$. Preferably, $V_{HTH}$ is a predefined percentage of, or a predefined value below, supply voltage, and $V_{LTH}$ is a predefined percentage or predefined value above ground potential. In any case, the output of comparator 340A is provided to decision circuit 304 via signal path $346_1$, and the output of comparator 340B is provided to decision circuit 304 via signal path $346_2$.

In operation, the analog acceleration signal on signal path 122 is compared to the high and low analog threshold voltages $V_{HTH}$ and $V_{LTH}$ such that the output of comparator 340A is high if the analog acceleration signal on signal path 122 is greater than or equal to $V_{HTH}$ and is otherwise low, and the output of comparator 340B is high if the analog acceleration signal on signal path 122 is less than $V_{LTH}$ and is otherwise low. In this embodiment, decision circuit 304 preferably includes a NOR gate 306C having inputs connected to signal paths $346_1$ and $346_2$, and having an output producing the inhibit signal INH2. Thus, as long as the analog acceleration signal on signal path 122 is between $V_{HTH}$ and $V_{LTH}$, the INH2 output of NOR gate 306C is a high logic-level, corresponding to an inactive INH2 signal as described hereinabove with respect to FIG. 4. If, however, the analog acceleration signal on signal path 122 exceeds $V_{HTH}$ or drops below $V_{LTH}$, the INH2 output of NOR gate 306C switches to a low logic-level, corresponding to an active INH2 signal as described with respect to FIG. 4 and thereby inhibiting deployment of the airbag 174. It is to be understood that the present invention contemplates embodiments of the present invention wherein the inhibit signal INH2 is active high, and any necessary changes to the error detection circuit $302_1$ to effectuate such alternative operation are within the knowledge of a skilled artisan. In any case, the rail/ground discrimination circuit 312 is thus operable to monitor the magnitude of the analog acceleration signal on signal path 122, and to inhibit airbag deployment if this magnitude falls outside of a preset signal magnitude range defined by threshold voltages $V_{LTH}$ and $V_{HTH}$.

Figure 8A:
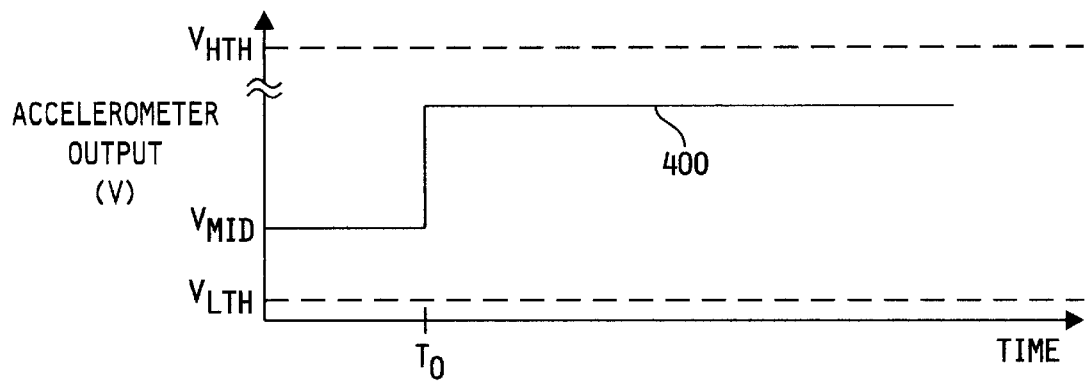
FIG. 8A is a plot of the accelerometer output illustrating an example event wherein airbag deployment is inhibited.
Figure 8B:
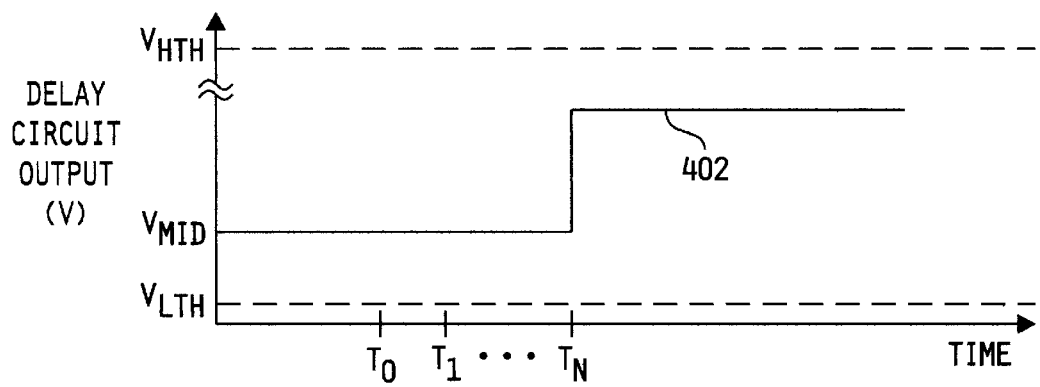
FIG. 8B is a plot of the output of the delay circuit of FIG. 5 illustrating an example event consistent with FIG. 8A wherein airbag deployment is inhibited.
Figure 8C:
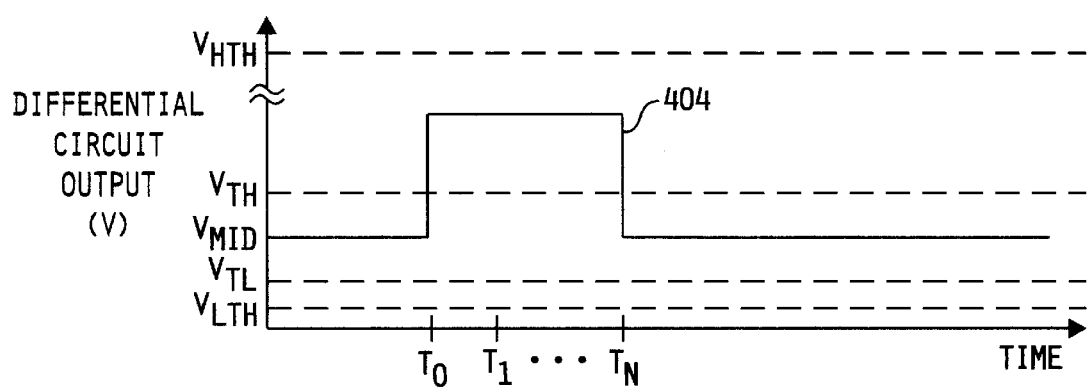
FIG. 8C is a plot of the output of the differential circuit of FIG. 5 illustrating an example event consistent with FIGS. 8A and 8B wherein airbag deployment is inhibited.

Referring now to FIGS. 8A–8C, example waveforms are shown illustrating operation of the error detection circuitry $302_1$ of the present invention under conditions where the signal threshold discrimination circuit 310 is operable to inhibit what would otherwise be an airbag deployment event. FIG. 8A illustrates a case where the output voltage 400 of the accelerometer $120_1$ rises instantaneously at time $T_0$ from its zero-G voltage level of mid-supply $V_{MID}$ to a voltage level indicative of a crash event that would typically be of sufficient severity to result in airbag deployment, but wherein this voltage level is below the near-rail voltage threshold $V_{HTH}$ and above the near-ground low voltage threshold $V_{LTH}$ so that NOR gate 306C produces an inactive inhibit signal INH2 (e.g., high logic level).

In general, it is understood that all real crash signals are characterized by significant changes in the analog acceleration signal as a function of time, and at no time would the analog accelerometer signal move to an elevated level and stay there, as illustrated with accelerometer output voltage 400, under a real deployment condition. It is possible, however, for the accelerometer $120_1$ to generate analog acceleration signals of the type illustrated by accelerometer output voltage 400 under non-crash conditions, and it is signals of this type that the error detection circuitry $302_1$ of the present invention has been designed to reject as valid deployment events. Events that could result in the generation of analog acceleration signals like accelerometer output voltage 400 include, but are not limited to, sensor fault conditions resulting in significant shift in the zero-G offset voltage level, similar fault conditions in the accelerometer signal conditioning circuitry, one or more electromagnetic interference (EMI) events, and the like.

Referring to FIG. 8B, the output voltage 402 of the delay circuit 320 is shown wherein the rising edge of the accelerometer output signal is shifted in time from $T_0$ to $T_N$. In a preferred embodiment of delay circuit 320, N=4 such that the time difference $T_4-T_0$ represents four clock cycles (e.g., 192 microseconds). Referring to FIG. 8C, the output voltage 404 of the differential circuit 322 is shown wherein the result of the signal subtraction (e.g., signal 400–signal 402) after time $T_N$ is equal to the zero-G level of mid-supply $V_{MID}$, and falls between the signal discrimination threshold voltages of $V_{TH}$ and $V_{TL}$. Comparators 326A and 326B accordingly each produce low level outputs on signal paths $334_1$ and $334_2$ respectively, thereby causing OR gate 306B to produce a low-level (e.g., active) inhibit signal INH1. It is to be understood active inhibit signals INH1 and/or INH2 must generally be asserted before an active airbag deployment command is asserted on signal path 307 to ensure that airbag deployment is inhibited, and in this case the inhibit signal INH1 produced as a result of the example event illustrated in FIG. 8C is asserted after time $T_N$ but prior to an active airbag deployment command on signal path 307. In any case, the AND gate 306A of the decision circuit 304 is responsive to the low level INH1 signal to produce a low level signal on signal path 308, thereby inhibiting airbag deployment.

Figure 9A:
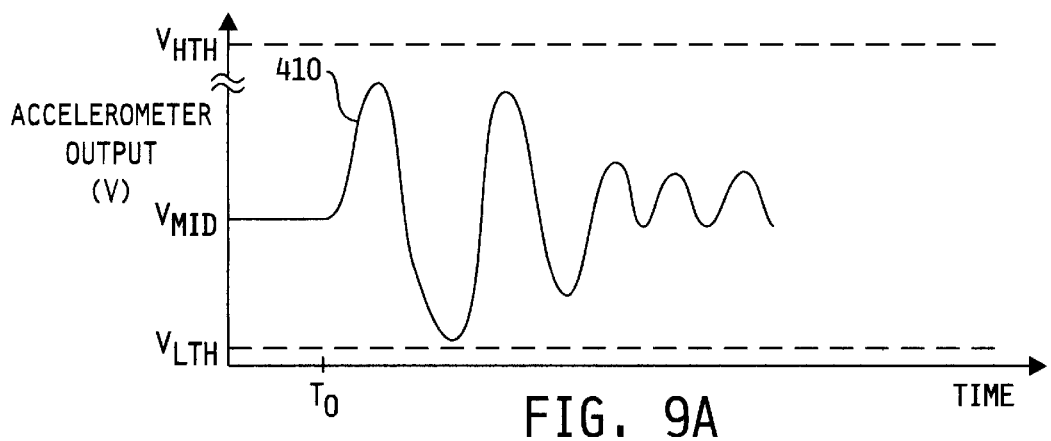
FIG. 9A is a plot of the output of the accelerometer illustrating an example event resulting in airbag deployment.
Figure 9B:
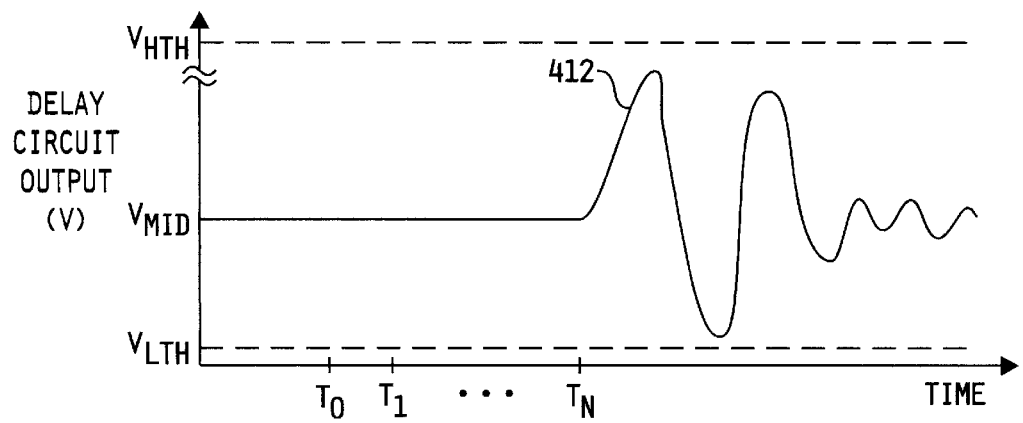
FIG. 9B is a plot of the output of the delay circuit of FIG. 5 illustrating an example event consistent with FIG. 8A that results in airbag deployment.
Figure 9C:
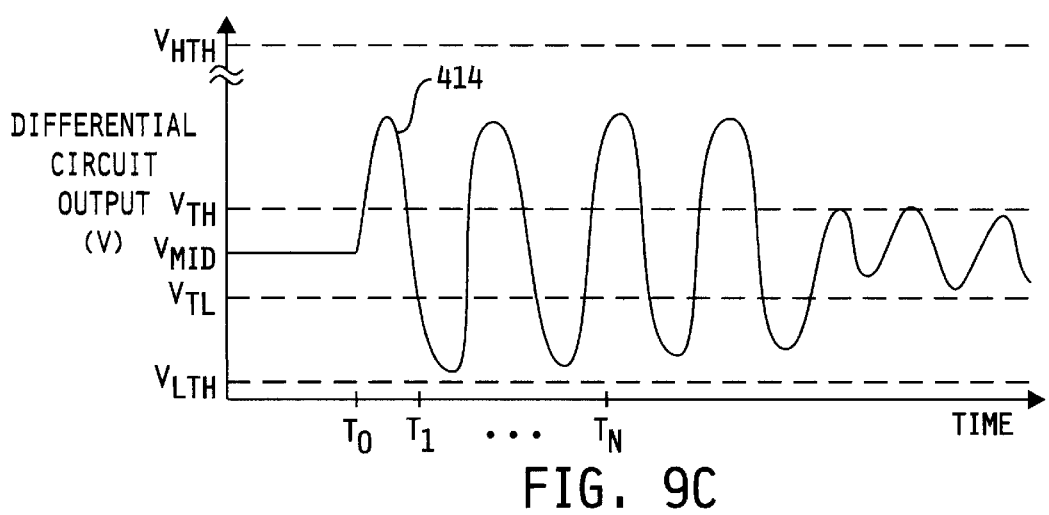
FIG. 9C is a plot of the output of the differential circuit of FIG. 5 illustrating an example event consistent with FIGS. 8A and 8B that results in airbag deployment.

Referring now to FIGS. 9A–9C, example waveforms are shown illustrating operation of the error detection circuitry $302_1$ of the present invention under conditions where the signal threshold discrimination circuit 310 is operable to allow airbag deployment resulting from a valid crash event of sufficient severity to warrant airbag deployment. FIG. 9A illustrates a case where the output voltage 410 of the accelerometer $120_1$ exhibits a rapidly moving signal having peaks extending above and below the zero-G reference point ($V_{MID}$). Signal 410 is maintained within the signal boundary defined by the near-rail threshold voltage $V_{HTH}$ and the near-ground threshold voltage $V_{LTH}$, so that the inhibit signal INH2 produced by NOR gate 306C remains inactive (e.g., high logic level). Signal 410 is typical of a valid crash event having signal peaks of sufficient magnitude to cause algorithm 305 to issue an active deployment control signal (e.g., high logic level).

Referring to FIG. 9B, the output voltage 412 of the delay circuit 320 is shown wherein the rising edge of the first peak of the accelerometer output signal is shifted in time from $T_0$ to $T_N$. In a preferred embodiment of delay circuit 320, N=4 such that the time difference $T_4-T_0$ represents four clock cycles of PH1 and PH2, or 192 microseconds. Referring to FIG. 9C, the output voltage 414 of the differential circuit 322 is shown wherein the result of the signal subtraction (e.g., signal 410–signal 412) after time $T_N$ exceeds is the zero-G level of mid-supply $V_{MID}$ in both directions, and therefore falls outside both of the signal discrimination threshold voltages of $V_{TH}$ and $V_{TL}$. Comparators 326A and 326B accordingly each produce high level outputs on signal paths $334_1$ and $334_2$ respectively, thereby causing OR gate 306B to produce a high-level (e.g., inactive) inhibit signal INH1. It is to be understood that even though the signal 414 beyond $T_N$ spends some time between the threshold voltages $V_{TH}$ and $V_{TL}$ as illustrated in FIG. 9C, the transitions of signal 414 between threshold voltages $V_{TH}$ and $V_{TL}$ are generally rapid so that signal 414 accordingly spends most of its time outside the $V_{TH}$ and $V_{TL}$ boundary. Thus, while the time spent by signal 414 within $V_{TH}$ and $V_{TL}$ may produce some delay in the deployment of airbag 174, this delay is generally insignificant and has not been found to result in any airbag deployment timing problems. In any case, the AND gate 306A of the decision circuit 304 is responsive to the high levels of the INH1 and INH2 signals to pass the active airbag deployment command on signal path 307 to airbag 174 for deployment thereof.

It should be apparent from the foregoing description that an important consideration in implementing the error detection circuit $302_1$ of the present invention lies in carefully establishing the delay time between $T_0$ and $T_N$ to ensure that the resulting delay period ($T_N-T_0$) is large enough to place real crash data outside $V_{TH}$ and/or $V_{TL}$ after expiration of the delay period, and is on the other hand small enough to ensure that the inhibit feature works faster than the deployment algorithm so that improper deployment conditions may be inhibited before deployment occurs. Optimal values for the time delay and signal thresholds will likely vary depending upon the application, and all such values are intended to fall within the scope of the present invention.

While this invention has been described as having a preferred design or construction, the present invention can be further modified within the spirit and scope of this disclosure and knowledge within the art. This application is therefore intended to cover variations, uses, or adaptations of the invention using its general principles. Further, this application is intended to cover such departures from the present disclosure within practice of the art to which this invention pertains and which falls within the bounds of the following claims.

What is claimed is:

1. An error detection circuit for an airbag deployment control system, comprising:

a delay circuit receiving an analog acceleration signal and producing a delay signal corresponding to said analog acceleration signal delayed in time;

a differential circuit subtracting said delay signal from said analog acceleration signal and producing a difference signal corresponding thereto; and a first comparison circuit responsive to said difference signal to produce a first inhibit signal for inhibiting deployment of an airbag if said difference signal falls within a first predefined signal range.

2. The error detection circuit of claim 1 wherein said first comparison circuit is further responsive to said difference signal to allow deployment of said airbag if said difference signal falls outside said first predefined signal range.

3. The error detection circuit of claim 1 further including a first threshold signal circuit producing first and second threshold signals, said first and second threshold signals defining said first predefined signal range therebetween.

4. The error detection circuit of claim 3 wherein said first comparison circuit includes:

a first comparator responsive to said difference signal and said first threshold signal to produce a first comparator output signal;

a second comparator responsive to said difference signal and said second threshold signal to produce a second comparator output signal; and a logic gate responsive to said first and second comparator output signals to produce said first inhibit signal.

5. The error detection circuit of claim 4 wherein said first and second threshold signals are each DC signals with said first threshold signal larger than said second threshold signal.

6. The error detection circuit of claim 4 wherein said first comparator includes a non-inverting input receiving said difference signal and an inverting input receiving said first threshold signal;

and wherein said second comparator includes an inverting input receiving said difference signal and a non-inverting input receiving said second threshold signal, said first threshold signal greater than said second threshold signal;

and wherein said logic gate is an OR gate.

7. The error detection circuit of claim 1 further including an accelerometer producing said analog acceleration signal.

8. The error detection circuit of claim 1 further including a second comparison circuit responsive to said analog acceleration signal to produce a second inhibit signal for inhibiting deployment of an airbag if said analog acceleration signal falls outside a second predefined signal range.

9. The error detection circuit of claim 8 further including a second threshold signal circuit producing third and fourth threshold signals, said third and fourth threshold signals defining said second predefined signal range therebetween.

10. The error detection circuit of claim 9 wherein said second comparison circuit includes:

a third comparator responsive to said analog acceleration signal and said third threshold signal to produce a third comparator output signal;

a fourth comparator responsive to said analog acceleration signal and said fourth threshold signal to produce a fourth comparator output signal; and a logic gate responsive to said third and fourth comparator output signals to produce said second inhibit signal.

11. The error detection circuit of claim 10 wherein said third threshold signal corresponds to a predefined percentage of a supply voltage and said fourth threshold signals corresponds to a predefined voltage level above ground potential.

12. The error detection circuit of claim 10 wherein said third comparator includes a non-inverting input receiving said analog acceleration signal and an inverting input receiving said third threshold signal;

and wherein said fourth comparator includes an inverting input receiving said analog acceleration signal and a non-inverting input receiving said fourth threshold signal, said third threshold signal greater than said fourth threshold signal;

and wherein said logic gate is a NOR gate.

13. The error detection circuit of claim 8 further including an accelerometer producing said analog acceleration signal.

14. A method of inhibiting airbag deployment in an airbag deployment control system, the method comprising the steps of:

receiving an analog acceleration signal over time;

delaying said acceleration signal for a predefined time period and producing a delay signal corresponding thereto;

subtracting said delay signal from said analog acceleration signal and producing a difference signal corresponding thereto;

comparing said difference signal with a first signal window; and inhibiting deployment of an airbag if said difference signal falls within said first signal window.

15. The method of claim 14 further including the steps of:

providing a first signal threshold;

providing a second signal threshold less then said first signal threshold; and defining said first signal window as a range of signals between said first and second signal thresholds.

16. The method of claim 15 further including the steps of:

comparing said analog acceleration signal with a second signal window; and inhibiting deployment of an airbag if said analog acceleration signal falls outside said second signal window.

17. The method of claim 16 further including the steps of:

providing a third signal threshold;

providing a fourth signal threshold less then said third signal threshold; and defining said second signal window as a range of signals between said third and fourth signal thresholds.

18. The method of claim 17 wherein said third signal threshold is greater than said first signal threshold;

and wherein said fourth signal threshold is less than said second signal threshold.

* * * * *